(12) United States Patent
Apolinari et al.

(10) Patent No.: US 11,964,333 B2
(45) Date of Patent: Apr. 23, 2024

(54) PIPE CUTTING APPARATUS

(71) Applicant: RITMO S.P.A., Teolo (IT)

(72) Inventors: Alessandro Apolinari, Cervarese Santa Croce (IT); Renzo Bortoli, Montegrotto Terme (IT)

(73) Assignee: RITMO S.P.A., Teolo (IT)

( * ) Notice: Subject to any disclaimer, the term of this patent is extended or adjusted under 35 U.S.C. 154(b) by 0 days.

(21) Appl. No.: 17/851,749

(22) Filed: Jun. 28, 2022

(65) Prior Publication Data
US 2023/0001494 A1 Jan. 5, 2023

(30) Foreign Application Priority Data

Jul. 1, 2021 (IT) .......................... 102021000017348

(51) Int. Cl.
*B23D 21/04* (2006.01)
(52) U.S. Cl.
CPC .................................... *B23D 21/04* (2013.01)
(58) Field of Classification Search
CPC .......... B26D 3/16; B26D 1/18; B23D 45/126; B23D 21/04; B23Q 9/0057
USPC .......................................................... 30/101
See application file for complete search history.

(56) References Cited

U.S. PATENT DOCUMENTS

| 2,567,833 A | 9/1951 | Chester et al. |
| 2006/0225545 A1 | 10/2006 | Nolan |

FOREIGN PATENT DOCUMENTS

| CN | 112496447 A | 3/2021 | |
| FR | 2911805 A1 * | 8/2008 | ............. B23D 21/04 |
| FR | 2911805 A1 | 8/2008 | |
| GB | 2535144 A * | 8/2016 | ............... B26D 3/16 |
| GB | 2536783 A * | 9/2016 | ............... B23B 3/26 |
| WO | 2016201149 A1 | 12/2016 | |

OTHER PUBLICATIONS

Translation of FR 2911805 A1 (Year: 2023).*

* cited by examiner

*Primary Examiner* — Nhat Chieu Q Do
(74) *Attorney, Agent, or Firm* — DUANE MORRIS LLC; Gregory M. Lefkowitz

(57) ABSTRACT

A pipe cutting apparatus has a rigid annular frame adapted to be coupled to a pipe to be cut. A cutting blade for cutting the pipe is removably associated with the annular frame. A mechanism is included to move the cutting blade with respect to the annular frame about an axis of revolution designed to coincide with a longitudinal axis of the pipe.

11 Claims, 11 Drawing Sheets

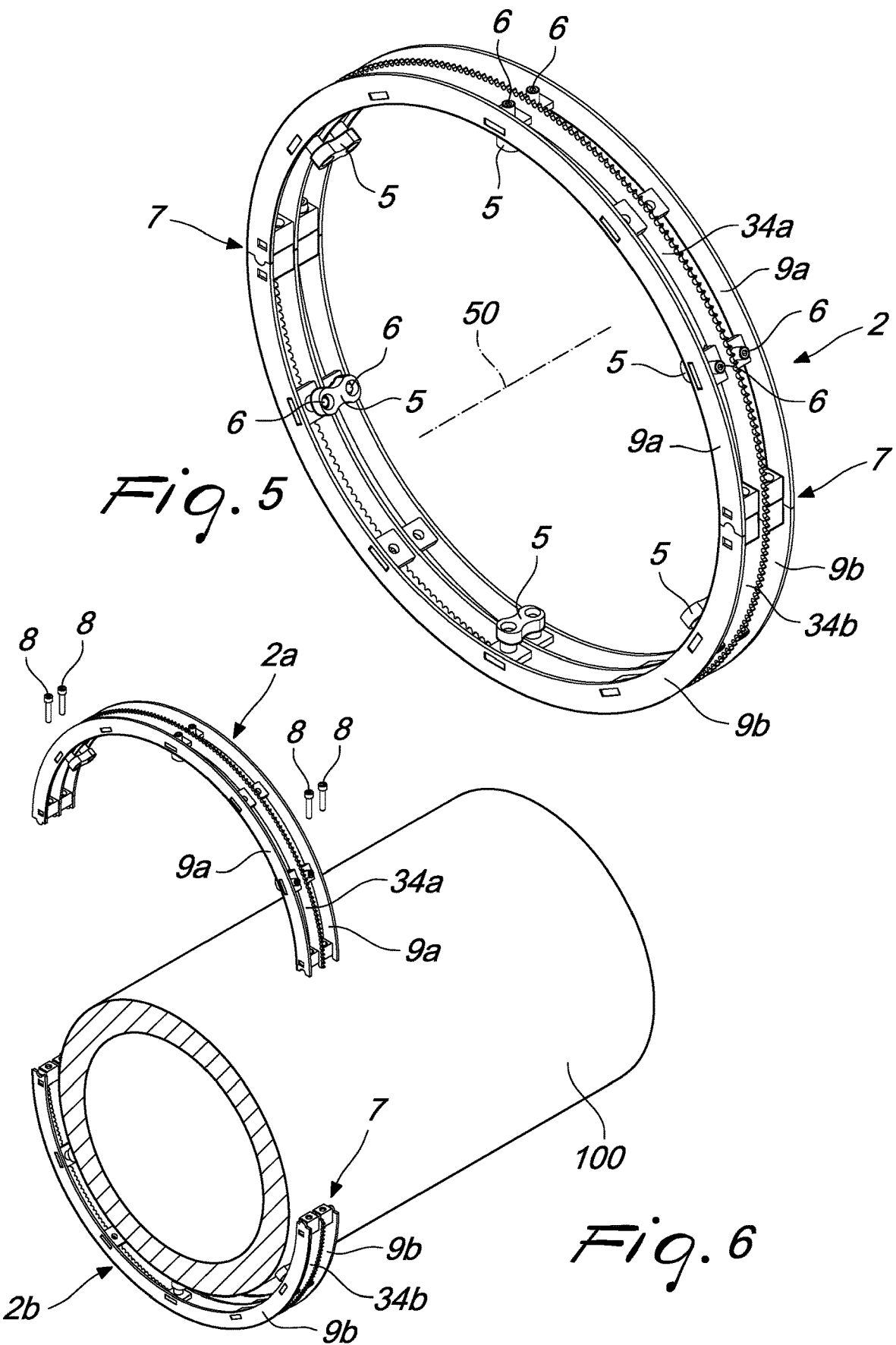

PIPE CUTTING APPARATUS

BACKGROUND OF THE INVENTION

The present invention relates to a pipe cutting apparatus.

More particularly, the invention relates to an apparatus for the orbital cutting of pipes of different thickness and diameter and made of plastic material, resin, composite material, or of any other material suitable for the manufacture of pipes for the distribution and dispensing of liquids and/or gaseous fluids.

As is known, pipes of the type described above are generally made monolithically, for example by extrusion or molding, and are cut into pipe segments of predetermined length that, if necessary, are shortened to size in order to obtain the dimensions required in each instance for the intended use.

The cutting operation is often performed at the building site and during installation, in order to obtain segments that are then joined with various methods, such as interlocking and/or fusing, both to provide new ducts and to maintain existing ducts.

The most commonly used apparatuses for pipe cutting are those that utilize circular sawing machines for woodcutting that, by suitable anchoring and guiding systems, are turned with an orbital motion around the pipe.

Those types of apparatus, despite being widely used, are not however free from drawbacks.

First of all, as a consequence of any deformation or ovalization of the pipe, the cut performed is often not perpendicular to the axis of the pipe, or the starting and end points of the cut do not coincide, consequently creating steps.

Moreover, the advancement of the sawing machine is manual and is performed by one or two operators who are forced to remain proximate to the cutting region, making this operation potentially dangerous.

OBJECTS OF THE INVENTION

The aim of the present invention is to provide a pipe cutting apparatus that overcomes the drawbacks of the cited prior art.

Within the scope of this aim, a particular object of the invention is to provide an apparatus that allows to perform cuts that are perfectly perpendicular to the axis of the pipe.

A further object of the invention is to provide an apparatus that allows to perform clean and precise cuts, in which the cut starting and end points coincide without creating any step.

A further object of the invention is to provide an apparatus that is capable of compensating for any deformation or ovalization of the pipe.

A further object of the invention is to provide an apparatus that allows to perform cuts that are not contaminated by lubricants or other substances.

A further object of the invention is to provide an apparatus that allows to perform cuts in complete safety, preserving the safety of the operators who perform the various process steps.

SUMMARY OF THE INVENTION

This aim and these objects, as well as others which will become better apparent hereinafter, are achieved by a pipe cutting apparatus, characterized in that it comprises a substantially rigid annular frame adapted to be coupled to a pipe to be cut, a means for cutting the pipe removably associated with the annular frame, and a movement means adapted to move the cutting means with respect to the annular frame about an axis of revolution designed to substantially coincide with the longitudinal axis of said pipe.

BRIEF DESCRIPTION OF THE DRAWINGS

Further characteristics and advantages will become better apparent from the description of a preferred but not exclusive embodiment of a pipe cutting apparatus according to the invention, illustrated by way of non-limiting example in the accompanying drawings, wherein:

FIG. 5 is a perspective view of another component of the apparatus according to the invention;

FIG. 6 is a perspective view of the component of FIG. 5 during its application to the pipe to be cut;

DETAILED DESCRIPTION

Figure 1:
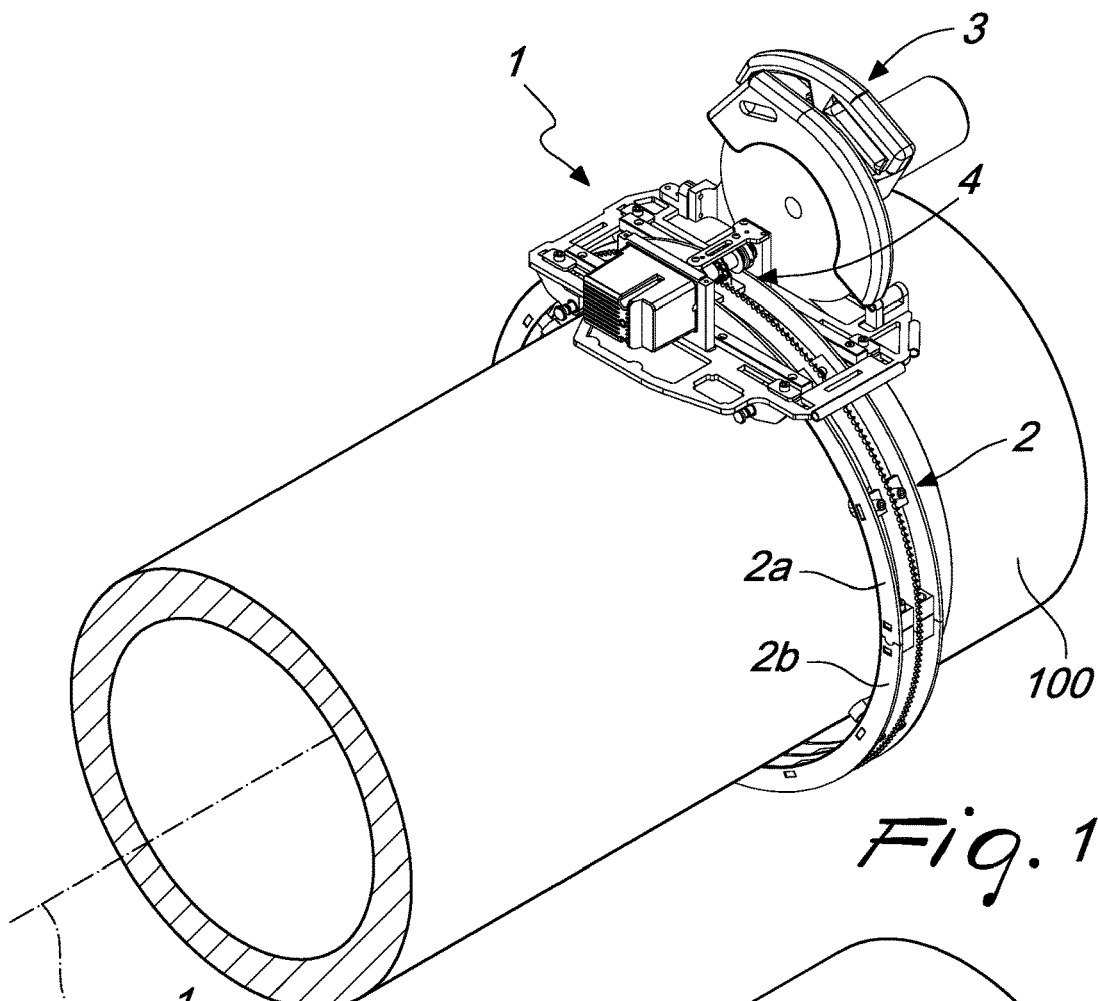
FIG. 1 is a perspective view of the apparatus according to the invention, applied to a pipe to be cut.
Figure 2:
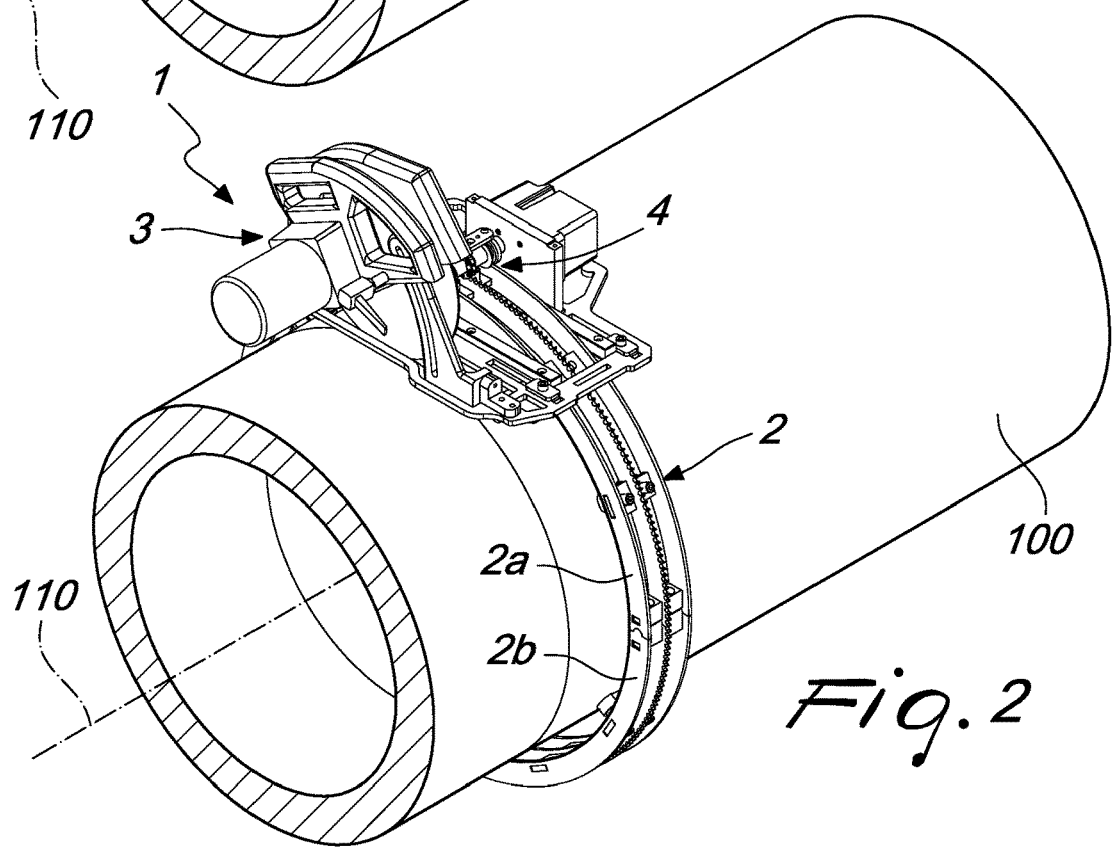
FIG. 2 is another perspective view of the apparatus according to the invention, applied to the pipe.
Figure 3:
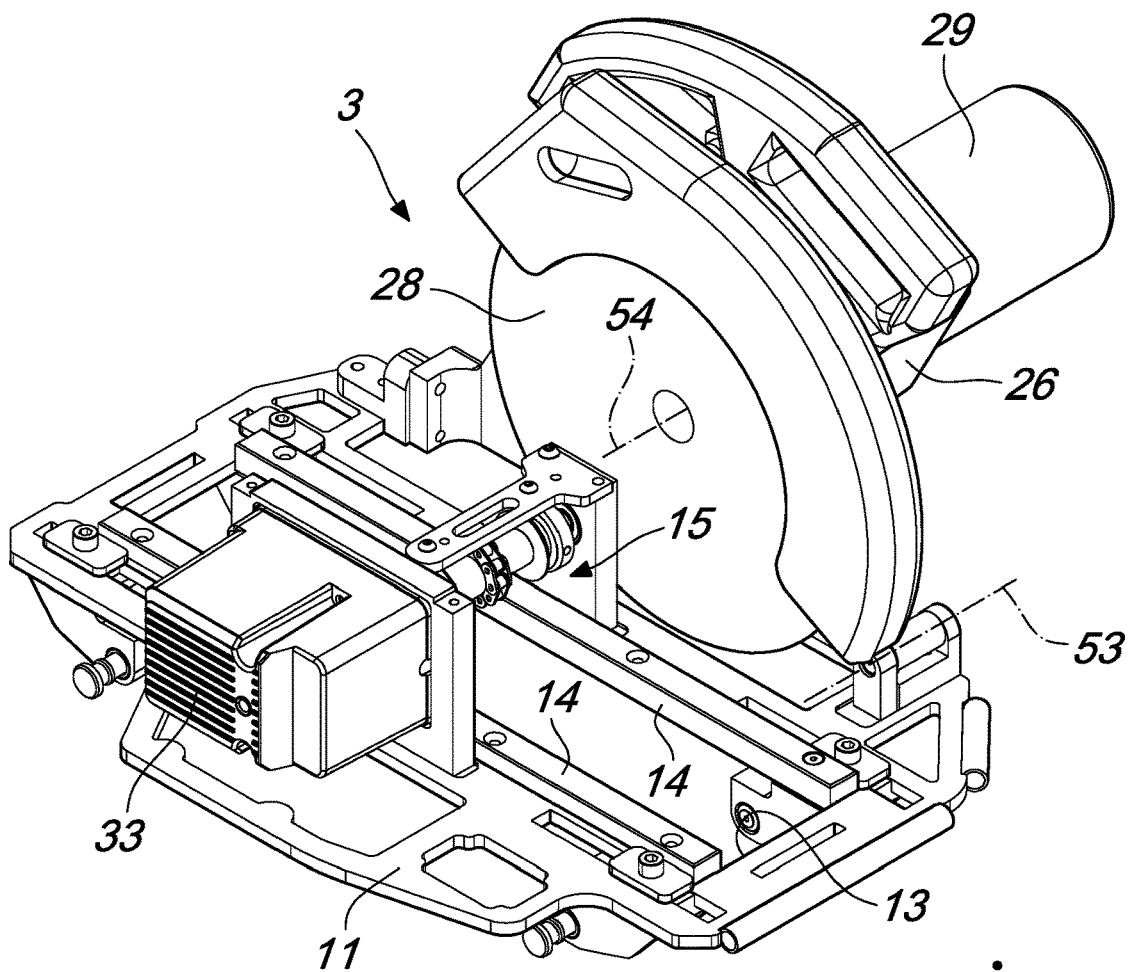
FIG. 3 is a perspective view of a component of the apparatus according to the invention.
Figure 4:
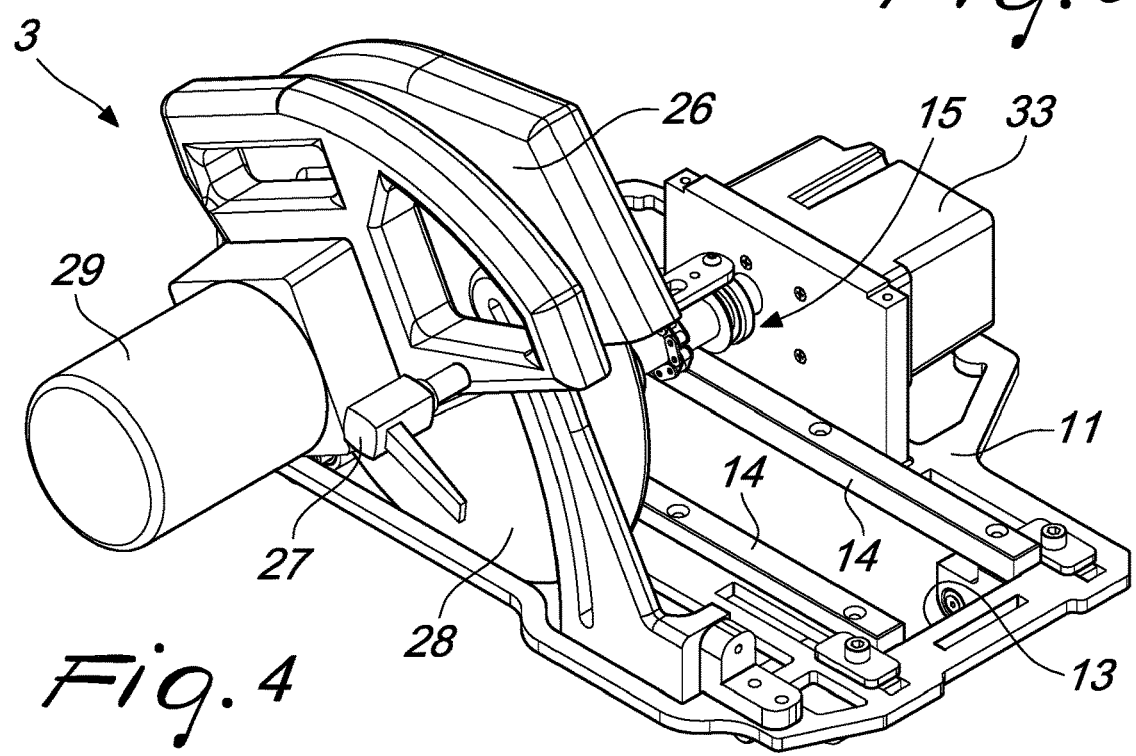
FIG. 4 is another perspective view of the component of FIG. 3.

With reference to the cited figures, the pipe cutting apparatus according to the invention, generally designated by the reference numeral 1, has a substantially rigid annular frame 2 adapted to be coupled to a pipe 100 to be cut, a means 3 for cutting the pipe 100 which is associated detachably with the annular frame 2, and a movement means 4 adapted to move the cutting means 3 with respect to the annular frame 2 about an axis of revolution 50 which is designed, during use, to substantially coincide with the longitudinal axis 110 of the pipe 100.

The annular frame 2 completely surrounds the pipe 100 and is associated thereto with a preset position and inclination with respect to the longitudinal axis 110, by means of a plurality of clamp plates 5 for contact with the outer face of said pipe 100.

Figure 9:
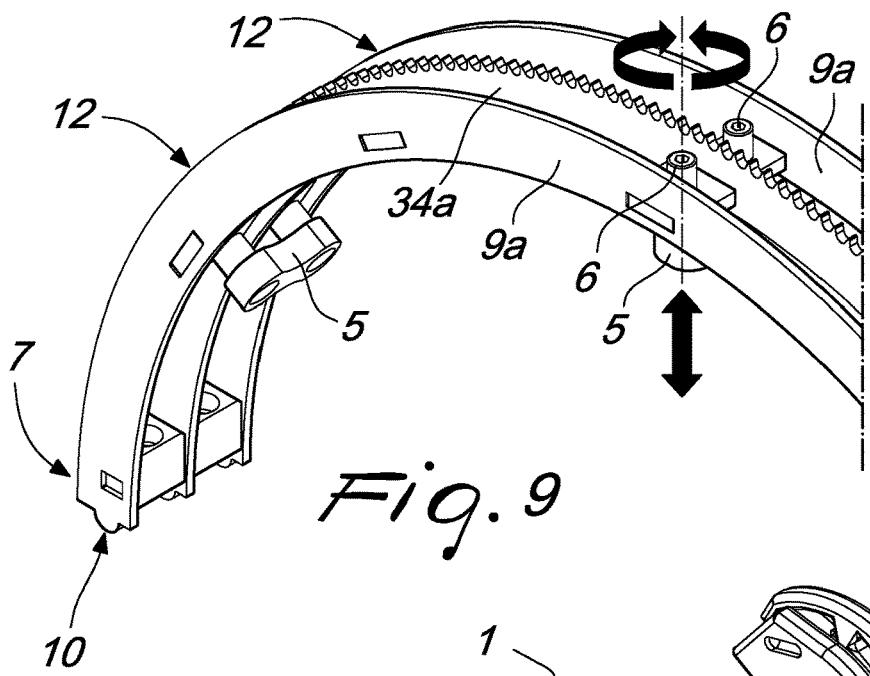
FIG. 9 is an enlarged view of another detail of the component of FIGS. 5 to 8.

The clamp plates 5 can be actuated individually and can move on command, for example by means of threaded members 6, radially toward the axis of revolution 50 and/or radially away from said axis, as shown substantially in FIG. 9.

In this manner it is possible to compensate for any ovalization or deformation of the pipe 100 and to fix thereto the annular frame 2 so as to make the axis of revolution 50 substantially coincide with the longitudinal axis 110.

Preferably, the clamp plates 5 are arranged symmetrically with respect to the axis of revolution 50 and are evenly angularly distributed along the circumference formed by the annular frame 2.

Advantageously, the annular frame 2 is formed by two or more frame members which are shaped like an annular sector and can be connected to each other by virtue of an adapted mating means 7, which can include for example screws 8.

In the embodiment shown by way of example, the frame members are two, designated respectively by the reference numerals 2a and 2b, and are substantially semicircular.

This last characteristic is particularly advantageous, for example, if the pipe 100 is part of a continuous line, since it allows to couple the annular frame 2 along any point of the pipe 100 and therefore not necessarily at the terminal portion thereof.

In the embodiment shown by way of example, the apparatus 1 includes two annular rails 9 which are mutually parallel and spaced and are an integral part of the structure of the annular frame 2.

However, the person skilled in the art may understand that the apparatus 1 could have an annular frame 2 with a structure of its own to which the annular rails 9 are coupled, or could have a different number of annular rails 9 (one or more than two).

In the shown example, each annular rail 9, being an integral part of the annular frame 2, is divided into two rail members, designated respectively by the reference numerals 9a and 9b, which are substantially semicircular or more generally shaped like an annular sector.

The rail members 9a and 9b are mutually joined by the mating means 7 which, in addition to ensuring the connection between the two members, allows to avoid interrupting the continuity of the circumferential profile of each annular rail 9 and to maintain the lateral alignment of the rail members 9a and 9b.

Figure 8:
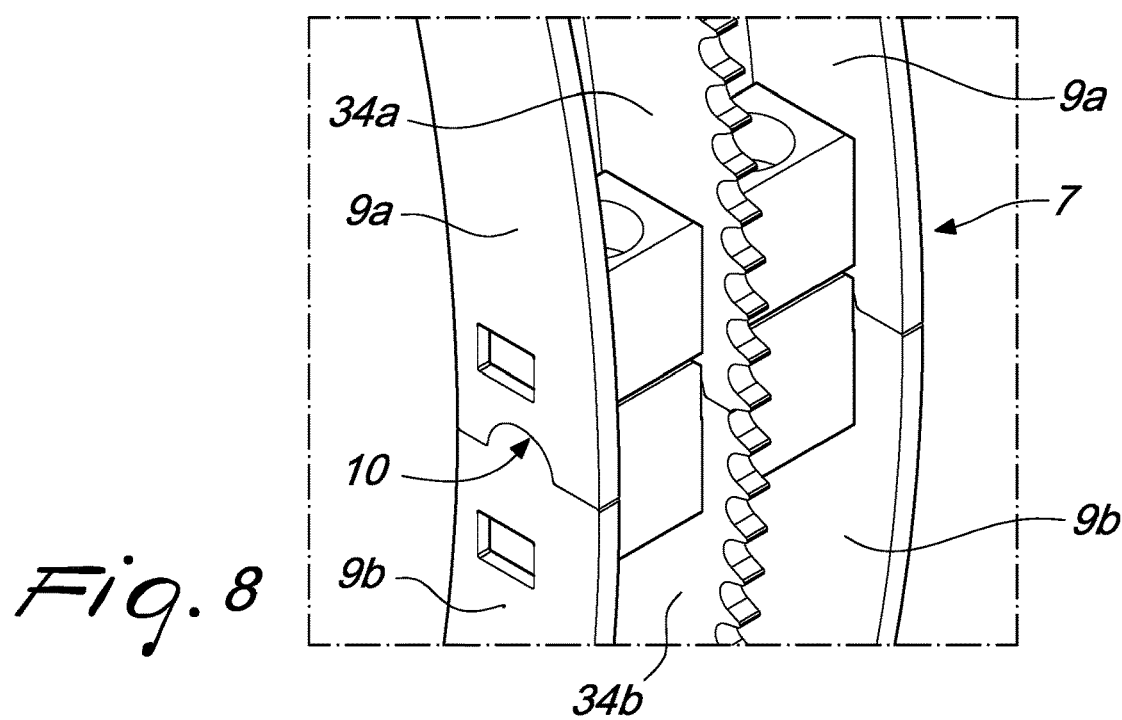
FIG. 8 is an enlarged view of a detail of the component of FIGS. 5 to 7.

Preferably, interlocking shaped portions 10 are provided at the mating surfaces of the rail members 9a and 9b, as shown in FIG. 8.

A carriage 11 which supports the cutting means 3 is associated slidingly and removably with the annular rails 9.

In the embodiment illustrated by way of example, the carriage 11 has a body which is monolithic or formed by parts that are rendered mutually integral so as to avoid mutual separation, and straddles the outer cylindrical edge 12 of the annular rails 9, which are partially inserted in a substantially rectangular opening 13 provided in the body of the carriage 11.

Preferably, at least two sides of the opening 13 there are sliders 14 which render the mating between the carriage 11 and the annular rails 9 particularly fluid with minimal play.

Conveniently, the carriage 11 is provided with engagement members 15 which can engage selectively the annular rails 9.

In the embodiment illustrated by way of example, the engagement members 15 include a pair of rollers 16 keyed on a shaft 17, which is mounted rotatably on the carriage 11 about a first axis of rotation 51 which is substantially parallel, in use, to the axis of revolution 50.

Each roller 16 preferably has a circumferential groove 18 designed to engage by rolling with the outer cylindrical edge 12, i.e., the edge that is distal with respect to the axis of revolution 50, of a corresponding annular rail 9.

The engagement members 15 furthermore include two pairs of pins 19 which are accommodated in respective seats 20 provided in supporting members 21 which are mounted so that they can slide on the carriage 11.

The pins 19 can rotate with respect to second axes of rotation 52, which are substantially mutually parallel despite not necessarily coinciding, and are also parallel, in use, to the axis of revolution 50.

The pins 19 can slide axially with respect to the second axes of rotation 52 and their sliding can be prevented, for example, by means of adapted retention members 22, which can move transversely to said axes between a locking position and a release position.

When the carriage 11 is mated with the annular rails 9, the pins 19 are designed to engage by rolling with an inner cylindrical edge 23, i.e., an edge which is proximal with respect to the axis of revolution 50, of the annular rails 9.

In practice, the rollers 16 and the pins 19 respectively engage the two opposite peripheral edges 12 and 23 of the annular rails 9, with the first axis of rotation 51 and the second axes of rotation 52 arranged substantially like the vertices of a triangle.

Advantageously, the supporting members 21 can move with respect to the carriage body 11 away from and toward each other.

The mutual approach of the supporting members 21 allows to facilitate the mating of the carriage 11 with the annular rails 9.

The mutual spacing of the supporting members 21 allows to stable the mating between the carriage 11 and the annular rails 9, reducing the radial plays with respect to the axis of revolution 50 between the two components of the apparatus 1.

Preferably, the supporting members 21 are joined to the body of the carriage 11 by virtue of screw members 24, which engage in slotted through holes 25 provided in the body.

Thus, by tightening or loosening the screw members 24 it is possible to respectively block the supporting members 21 to the carriage 11 or release their sliding within a stroke that is delimited by the slotted through holes 25.

In the embodiment illustrated by way of example, the cutting means 3 includes a sawing machine 26, of the type commonly commercially available.

The sawing machine 26 is mounted on the carriage 11 so that it can move on command radially toward the axis of revolution 50 and/or radially away from it.

Preferably, the sawing machine 26 is hinged to the body of the carriage 11 about a pivoting axis 53 which is substantially parallel, in use, to the axis of revolution 50.

The adjustment of the angular position of the sawing machine 26 can be achieved, for example, by acting on a locking/release handle 27.

The sawing machine 26 is equipped with a cutting disk 28 which is mounted on a shaft turned by a first motor 29, for example of the electric type, about a third axis of rotation 54 which is substantially parallel, in use, to the axis of revolution 50.

Figure 17:
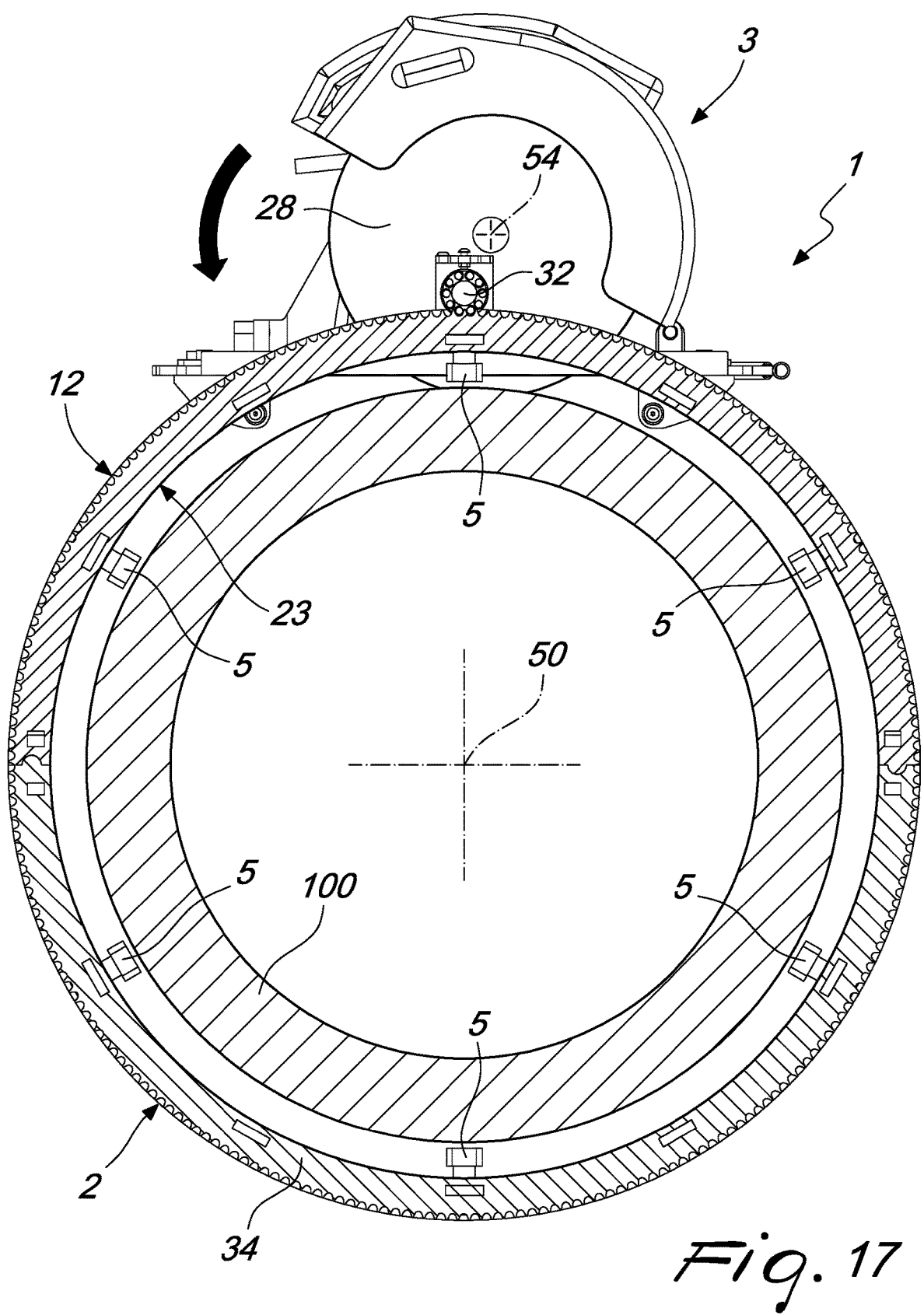
FIG. 17 is a partially sectional side view of the apparatus according to the invention during the cutting of the pipe.
Figure 18:
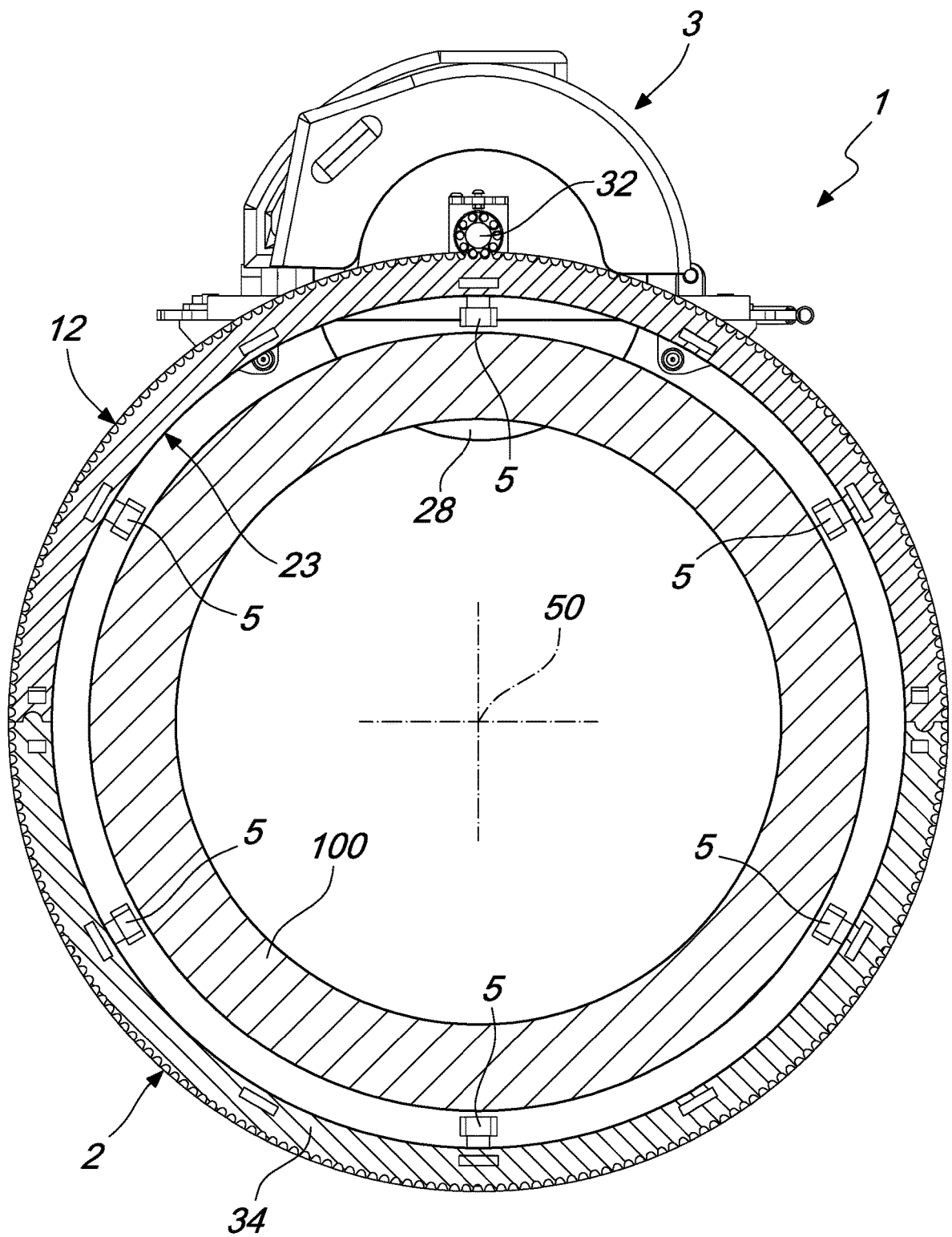
FIG. 18 is another partially sectional side view of the apparatus according to the invention during the cutting of the pipe.

The oscillating motion of the sawing machine 26 about the pivoting axis 53, i.e., with respect to the carriage 11 mated with the annular rails 9, allows to make the cutting disk 28 sink to a greater or smaller extent into the thickness of the pipe 100, as shown in FIGS. 17 and 18.

The sawing machine 26 is also provided with an orbital motion around the axis of revolution 50, i.e., around the pipe 100, which is obtained by virtue of the movement means 4 which interacts with the carriage 11.

The movement means 4 includes a first transmission member 30 which is mounted rotatably on the carriage 11, about the first axis of rotation 51, and a second fixed transmission member 31, which is coupled to the annular frame 2.

Preferably, the first transmission member 30 is constituted by a pinion 32, preferably of the roller type, which is integral with the shaft 17, which is turned about the first rotation axis 51 by a second motor 33, for example of the electric type, supported by the carriage 11.

In the embodiment illustrated by way of example, the pinion 32 is obtained by winding and welding a chain around the shaft 17, but in alternative embodiments, not shown, it might be provided differently.

The second transmission member 31 instead essentially consists of a ring gear 34 provided with teeth adapted to engage in succession the rollers of the pinion 32.

Preferably, the ring gear 34 is an integral part of the annular frame 2 and therefore it, too, is divided into two ring gear members, designated by the reference numerals 34a and 34b respectively, which are substantially semicircular or more generally shaped like an annular sector.

The ring gear members 34a and 34b are mutually joined by virtue of the mating means 7, which are configured so as to avoid interrupting the continuity of the pitch of the set of teeth of the ring gear 34 and maintain the lateral alignment of the ring gear members 34a and 34b, as shown substantially in FIG. 8.

The operation of the pipe cutting apparatus according to the present invention is as follows.

Figure 7:
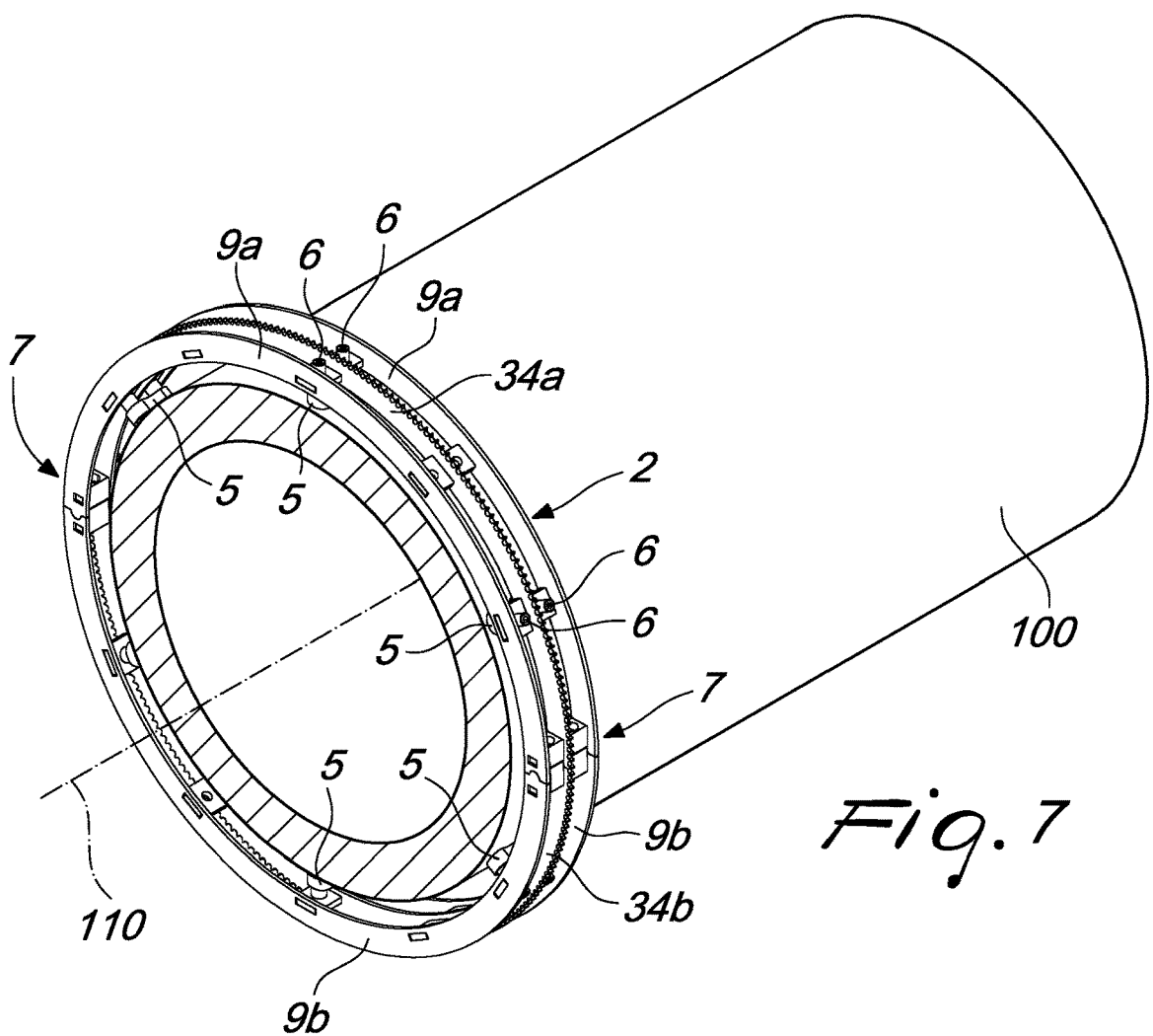
FIG. 7 is a perspective view of the component of FIGS. 5 and 6 applied to the pipe.

In a preliminary step of preparation of the apparatus 1 for the cut required by the specific process, the annular frame 2 is associated with and coupled to the pipe 100, as shown substantially in FIGS. 6 and 7.

Functionally, assuming that initially the clamp plates 5 are in the position of maximum radial spacing from the axis of revolution 50, the association of the annular frame 2 with the pipe 100 occurs by arranging the two frame members 2a and 2b around it and by joining them by virtue of the mating means 7.

If the cut is to be performed at or proximate to the end portion of the pipe 100, the operation of mating the two frame members 2a and 2b so as to form a single body does not necessarily have to occur astride the pipe 100 but can also be performed separately, associating the annular frame 2 with it at a later time.

Once the annular frame 2 is correctly fitted over the pipe 100, the clamp plates 5 are moved radially closer to the axis of revolution 50, trying to make said axis coincide substantially with the longitudinal axis 110 of the pipe 100 and to compensate for any ovalization or deformation of the pipe.

This operation is performed by acting on the threaded members 6, which by rotating modify the radial position of the clamp plates 5 until they rest with a slight pressure against the outer face of the pipe 100.

Figure 10:
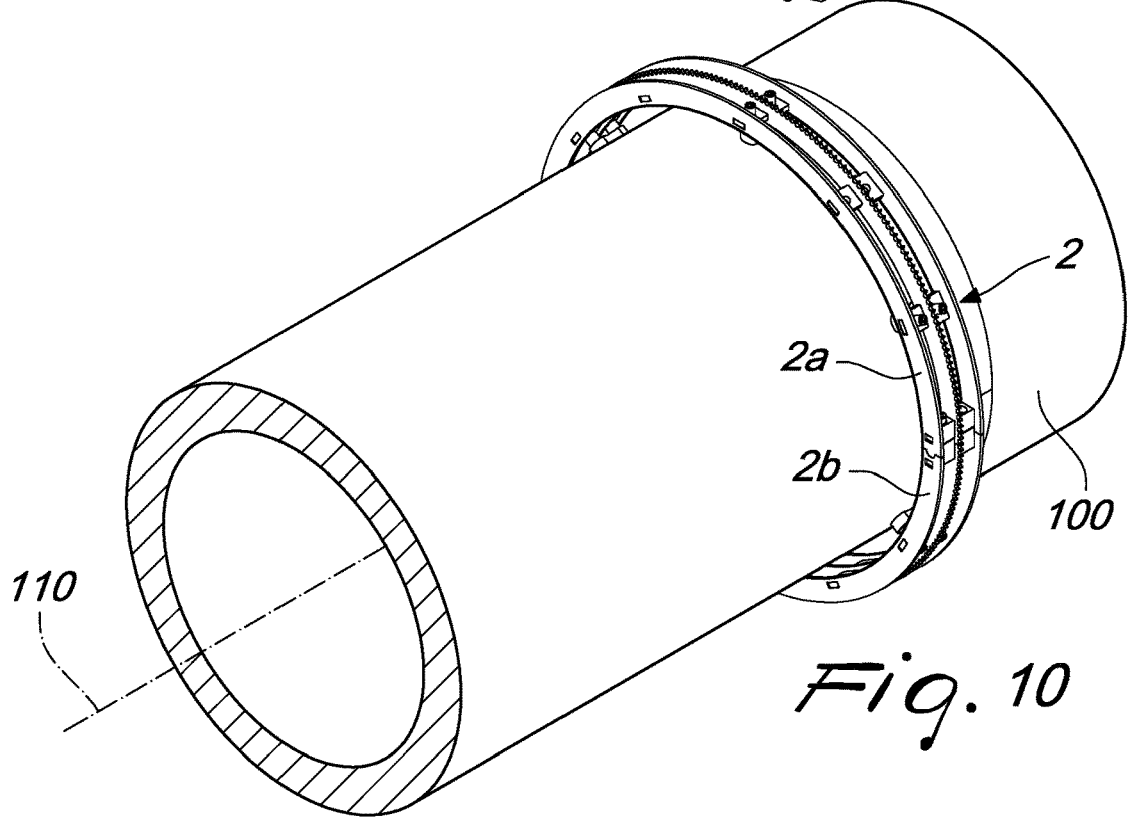
FIG. 10 is a perspective view of the apparatus according to the invention during its application to the pipe to be cut.
Figure 11:
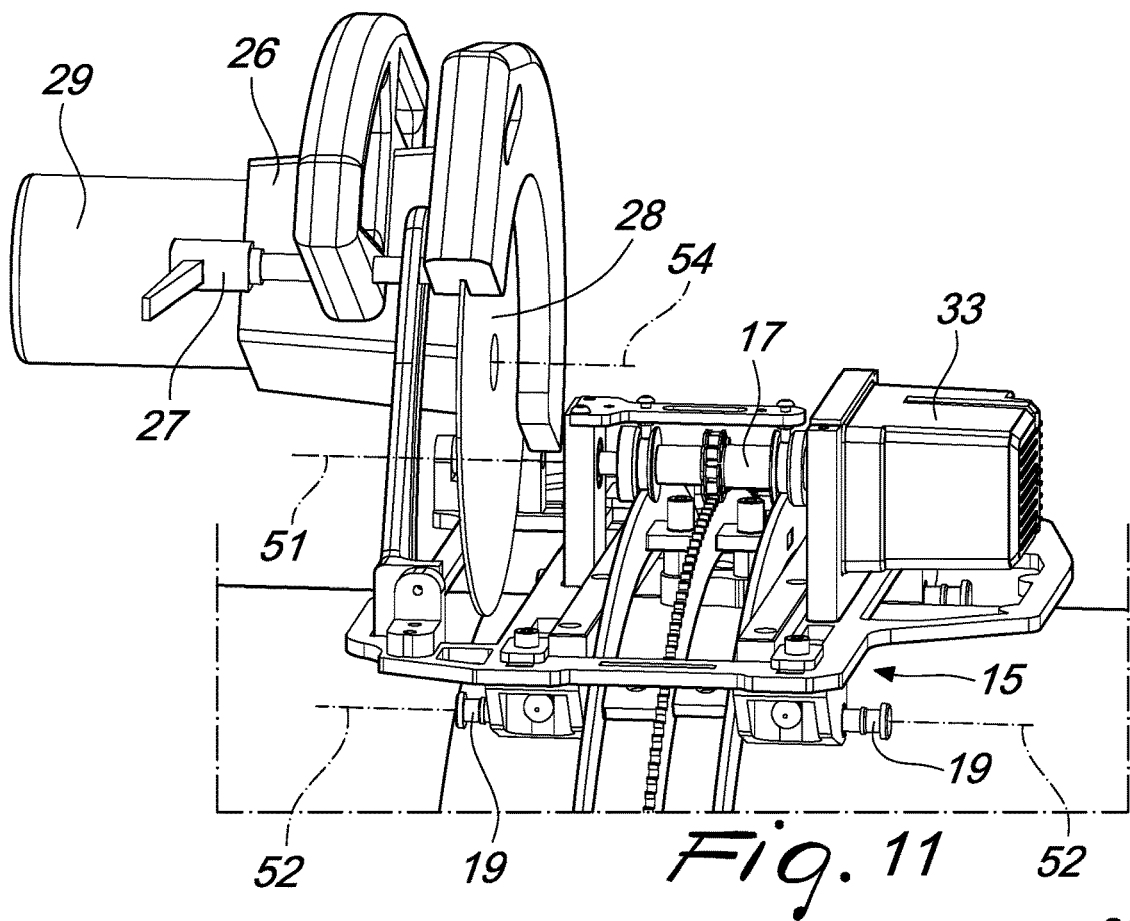
FIG. 11 is a perspective view of a detail of the apparatus according to the invention.
Figure 12:
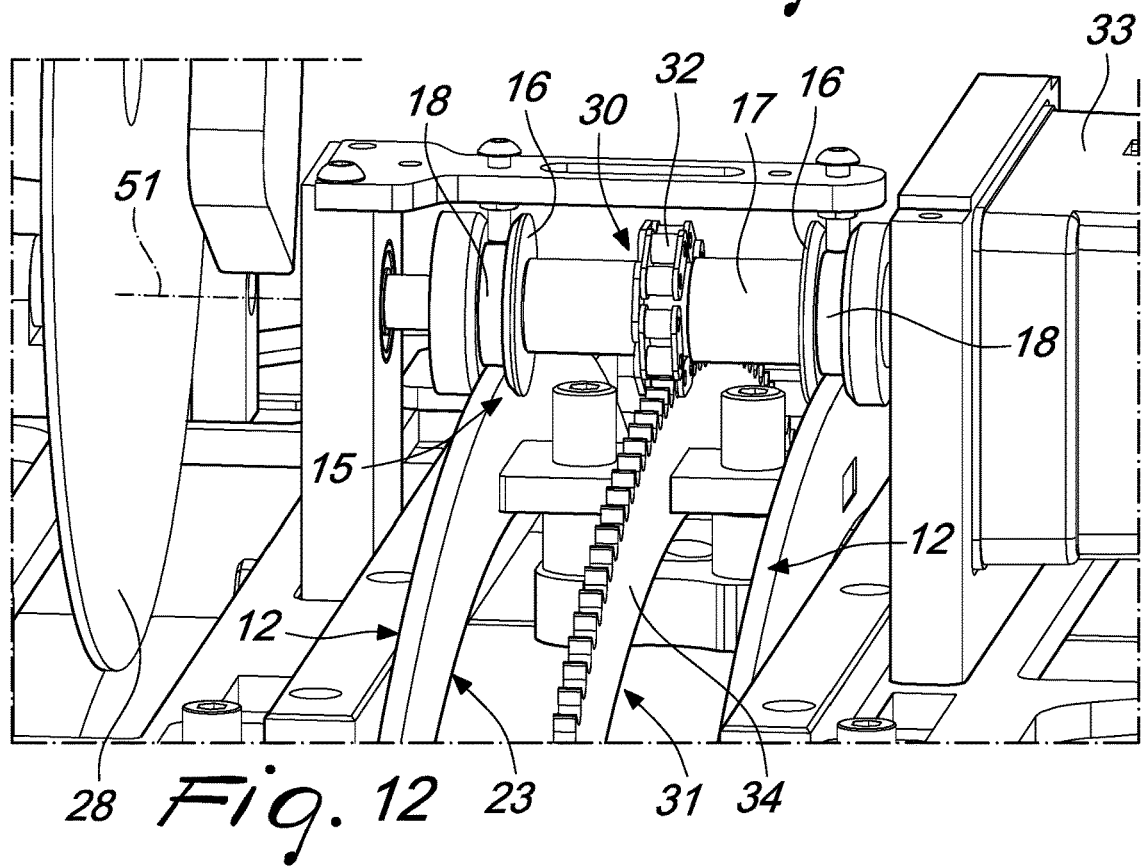
FIG. 12 is an enlarged view of the preceding figure.
Figure 13:
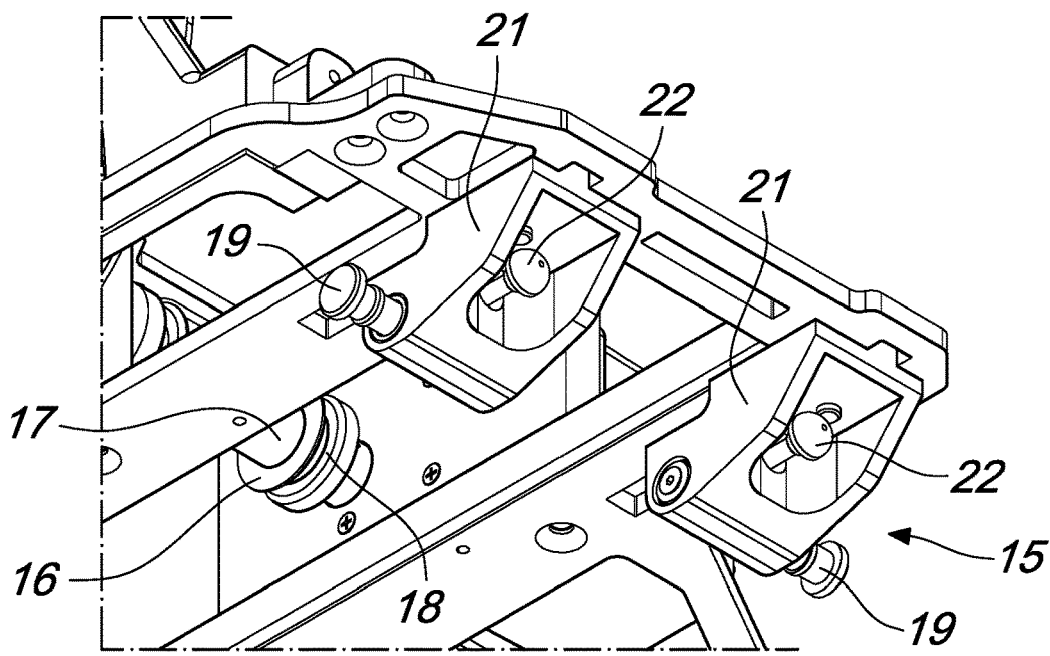
FIG. 13 is a perspective view of another detail of the apparatus according to the invention.
Figure 14:
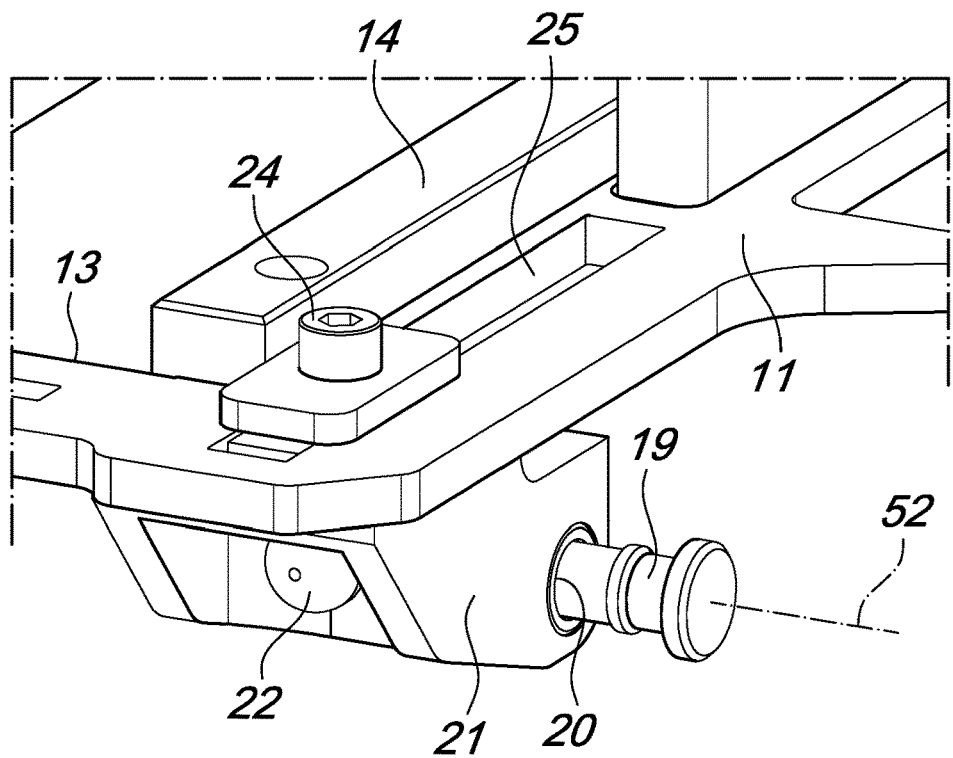
FIG. 14 is a perspective view of another detail of the apparatus according to the invention.
Figure 15:
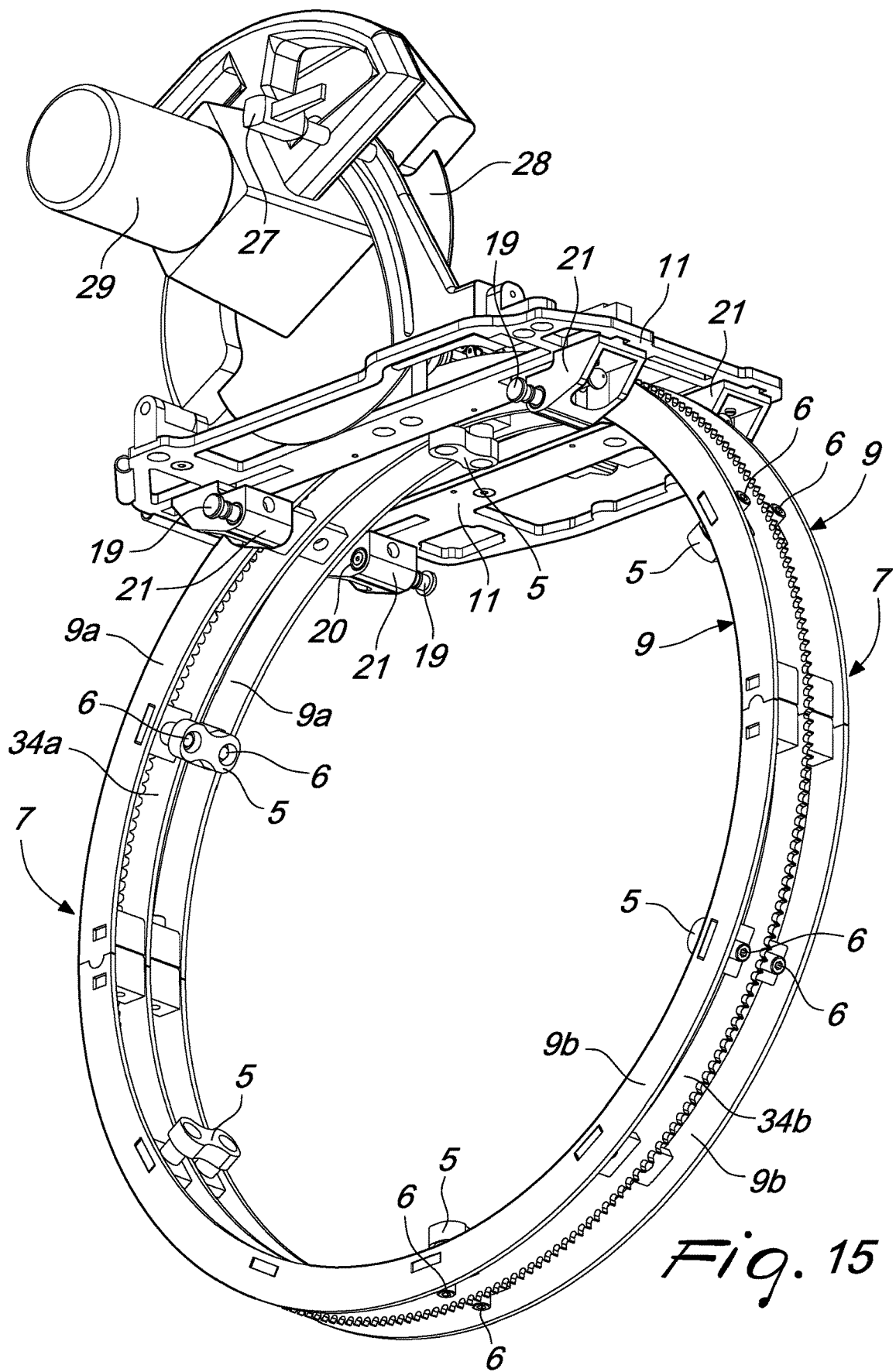
FIG. 15 is a perspective view of the apparatus according to the invention.

When the annular frame 2 is coupled correctly to the pipe 100, the carriage 11 and the sawing machine 26 are associated with it, as shown substantially in FIG. 10.

Beforehand, the pins 19 are retracted into the respective seats 20, completely freeing the opening 13, and to move mutually closer the supporting members 21, loosening the screw members 24 and making them slide in the slotted through holes 25 until the supporting members 21 are brought to their minimum mutual distance.

At this point, the carriage 11 is arranged astride the annular frame 2, partially inserting the annular rails 9 in the opening 13, until the outer cylindrical edge 12 of each rail is engaged in the circumferential groove 18 of the corresponding roller 16 and the teeth of the ring gear 34 engage in the openings formed in the pinion 32 by the chain.

Figure 16:
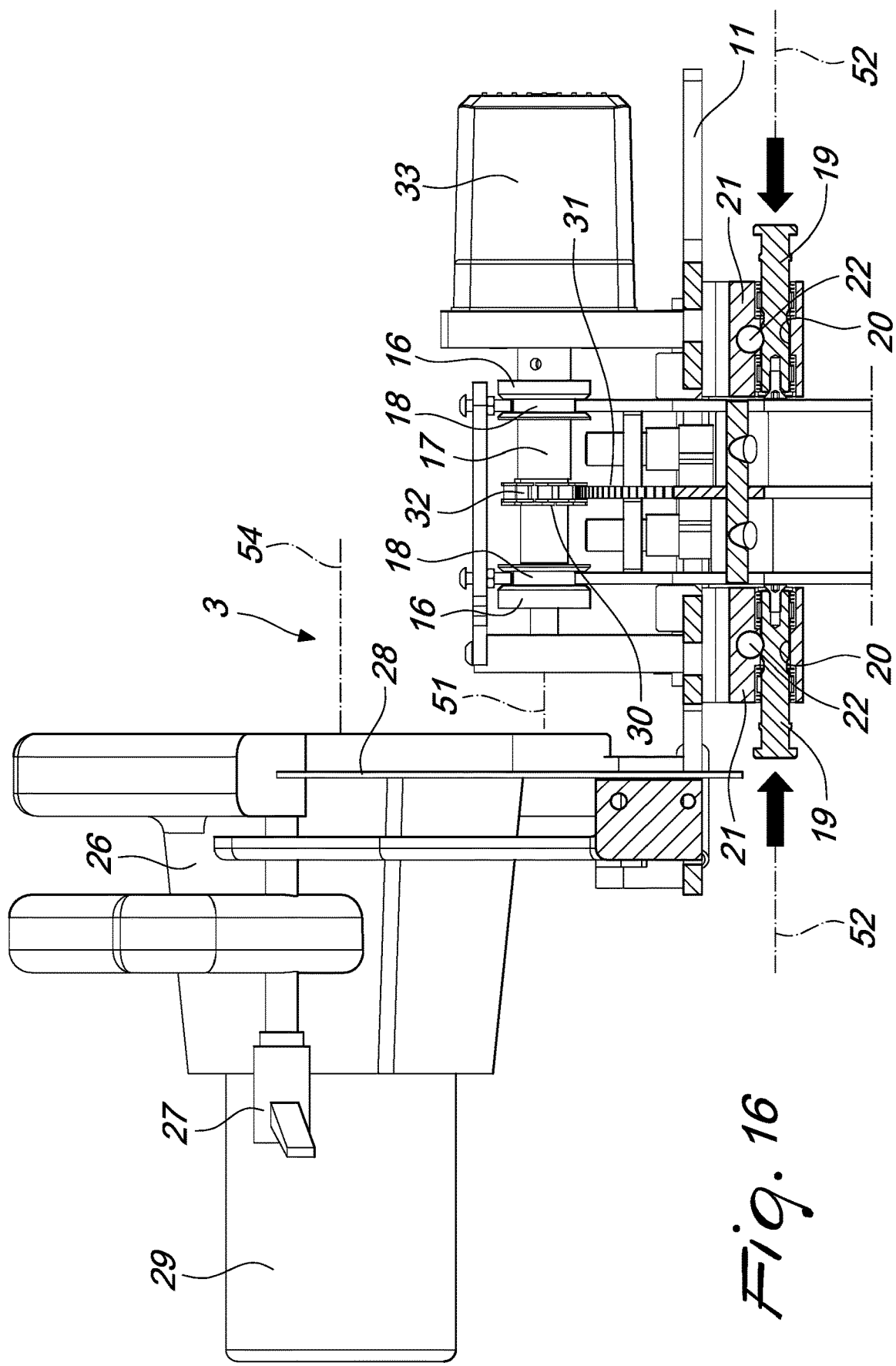
FIG. 16 is a partially sectional front view of the apparatus according to the invention.

Subsequently, the pins 19 are extracted from the respective seats 20, making them protrude from the supporting members 21 toward the inside of the opening 13, as shown substantially in FIG. 16.

The position of the pins is then locked by means of the retention members 22 and the supporting members 21 are moved mutually apart by making the screw members 24 slide in the slotted through holes 25 until the supporting members 21 are moved to the maximum possible mutual distance, i.e. so as to engage the pins 19 with the inner cylindrical edge 23 of the annular rails 9, eliminating plays completely.

With the tightening of the screw members 24, the operations required to associate the cutting means 3 with the annular frame 2 substantially end and it is possible to start the operations for cutting the pipe 100.

The sawing machine 26 is thus started, by supplying power to the first motor 29, and moved toward the axis of revolution 50, making it oscillate about the pivoting axis 53.

When the cutting disk 28 sinks into the wall of the pipe 100 until it crosses its thickness completely, the position of the sawing machine 26 with respect to the carriage 11 is locked by acting on the handle 27.

At this point, the second motor 33 is also powered and, by means of the continuous rolling of the pinion 32 on the ring gear 34, causes the advancement of the carriage 11 and the sawing machine 26 along the circumference of the pipe 100 with an orbital motion.

Once the sawing machine 26 has performed a full rotation about the pipe 100 and has completed the cut, the second motor 33 and the first motor 29 are turned off.

In this condition it is possible to separate the carriage 11 from the annular frame 2 and the annular frame 2 from the pipe 100 with operations which are the reverse of the ones described previously.

In practice it has been found that the invention achieves the intended aim and objects, providing a pipe cutting apparatus which, also by the presence of a rigid annular frame that guides the orbital motion of the sawing machine, allows to perform cuts that are perfectly perpendicular to the axis of the pipe.

Also, in this manner the cuts are clean and precise and the cut starting and end points coincide without creating any step.

A further advantage is that the apparatus according to the present invention is capable of compensating for any deformation or ovalization of the pipe.

A further advantage is that the cuts are not contaminated by lubricants or other substances.

It should also be considered that the apparatus according to the present invention allows to perform cuts in total safety for the operators.

The materials used, as well as the dimensions and shapes, may of course be any according to the requirements and the state of the art.

This application claims the priority of Italian Patent Application No. 102021000017348, filed on Jul. 1, 2021, the subject matter of which is incorporated herein by reference.

The invention claimed is:

1. A pipe cutting apparatus, comprising:
a rigid annular frame adapted to be coupled to a pipe to be cut;
a cutting means for cutting said pipe being removably mounted on with said annular frame; and
a movement means adapted to move said cutting means with respect to said annular frame about an axis of revolution configured to coincide with the longitudinal axis of said pipe,
wherein:
said annular frame comprises at least one annular rail which comprises two or more rail members shaped as an annular sector, said rail members being connectable to each other by mating means so as not to break the continuity of the profile of said annular rail and maintain the lateral alignment of said rail members;
said cutting means comprises a carriage that is slidingly and removably associated with said annular rail, said carriage having engagement members selectively engageable with said annular rail;
said engagement members comprise at least one pair of pins rotatably mounted on said carriage about second axes of rotation which are parallel to said axis of revolution; said pins being adapted to engage a second cylindrical edge of said annular rail; and
said pins are accommodated in respective seats formed on supporting members slidingly mounted on said carriage, said pins being rotatable about respective ones of said second axes of rotation and being able to slide selectively along or parallel to the respective ones of said second axes of rotation.

2. The apparatus according to claim 1, wherein said annular frame comprises a plurality of clamp plates for contact with the outer face of said pipe, said clamp plates being arranged symmetrically with respect to said axis of revolution and being radially movable on command toward and/or away from said axis of revolution.

3. The apparatus according to claim 1, wherein said annular frame comprises two or more frame members shaped as an annular sector; said frame members being connectable to each other by a mating means.

4. The apparatus according to claim 1, wherein said engagement members comprise at least one roller which is rotatably mounted on said carriage about a first axis of rotation which is parallel to said axis of revolution, said roller being adapted to engage a first cylindrical edge of said annular rail.

5. The apparatus according to claim 1, wherein said carriage comprises a means for adjusting the position of said supporting members and of said pins; said supporting members being movable toward and/or away from each other.

6. The apparatus according to claim 1, wherein said cutting means comprises a sawing machine mounted on said carriage, said sawing machine being radially movable on command toward and/or away from said axis of revolution.

7. The apparatus according to claim 6, wherein said sawing machine comprises a cutting disk which is rotatable about a third axis of rotation which is parallel to said axis of revolution, said cutting disk being functionally connected to a first motor supported by said carriage.

8. The apparatus according to claim 1, wherein said movement means comprises at least one first transmission member rotatably mounted on said carriage about said first axis of rotation and a second fixed transmission member which is coupled to said annular frame, said first rotation member being functionally connected to a second motor supported by said carriage.

9. The apparatus according to claim 8, wherein said first transmission member comprises a roller pinion which is integral with a transmission shaft of said second motor.

10. The apparatus according to claim 9, wherein said second transmission member comprises a ring gear which is coupled to said annular frame, said ring gear having teeth adapted to engage in openings formed in said pinion.

11. The apparatus according to claim 10, wherein said ring gear comprises two or more ring gear members shaped as an annular sector, said ring gear members being connectable to each other by said mating means so as not to break the continuity of the pitch of the set of teeth of said ring gear and maintaining a lateral alignment of said ring gear members.

* * * * *